United States Patent [19]

Harkness

[11] 4,356,644
[45] * Nov. 2, 1982

[54] ROOT GRUBBING PLOW

[76] Inventor: Travis O. Harkness, Rte. 1, Box 95-A, Kaufman, Tex. 75142

[*] Notice: The portion of the term of this patent subsequent to Oct. 26, 1999, has been disclaimed.

[21] Appl. No.: 230,005

[22] Filed: Jan. 30, 1981

Related U.S. Application Data

[63] Continuation-in-part of Ser. No. 201,543, Oct. 28, 1980.

[51] Int. Cl.³ .................. A01B 13/00; A01G 23/06
[52] U.S. Cl. .................... 37/2 R; 172/448; 172/474; 172/698; 254/131.5
[58] Field of Search ............... 37/2 R; 172/439, 443, 172/444, 448, 451, 464, 474, 698, 699, 712, 714; 254/131.5, 132, 199; 144/34 A

[56] References Cited

U.S. PATENT DOCUMENTS

| 830,783 | 9/1906 | Groesbeck | 414/687 |
|---|---|---|---|
| 905,399 | 12/1908 | Zimmerman | 37/2 R |
| 1,143,204 | 6/1915 | Kilgore et al. | 172/698 X |
| 1,889,984 | 12/1932 | Glasier | 254/131.5 |
| 2,047,498 | 7/1936 | Thew | 172/698 X |
| 2,230,766 | 2/1941 | Smith | 172/498 |
| 2,269,119 | 1/1942 | Mason | 254/131.5 |
| 2,341,807 | 2/1944 | Olmstead et al. | 172/439 X |
| 2,410,508 | 11/1946 | Lamme | 173/38 |
| 2,441,070 | 5/1948 | Hoover | 414/715 |
| 2,506,662 | 5/1950 | Cusenbary | 37/2 R |
| 2,633,792 | 4/1953 | Haines | 37/2 R |
| 2,648,997 | 8/1953 | Sawyer | 74/586 |
| 2,673,510 | 3/1954 | Bailey | 37/2 R |
| 2,678,596 | 5/1954 | Todd | 172/444 |
| 2,734,290 | 2/1956 | Tuttle | 37/2 R |
| 2,735,198 | 2/1956 | Zogg et al. | 37/2 R |
| 2,751,696 | 6/1956 | Weinhold | 37/2 R |
| 2,863,372 | 12/1958 | Bergerson | 172/166 |
| 2,980,189 | 4/1961 | Jacobs | 171/63 |
| 3,037,357 | 6/1962 | Knapp et al. | 172/439 X |
| 3,101,794 | 8/1963 | Bechman | 172/698 |
| 3,103,076 | 9/1963 | Schultz | 37/2 R |
| 3,421,779 | 1/1969 | Shelby | 172/448 X |
| 3,503,456 | 3/1970 | Larson | 172/464 X |
| 3,583,494 | 6/1971 | Thompson et al. | 172/439 X |
| 3,603,007 | 9/1971 | Naber et al. | 37/2 R |
| 3,850,450 | 11/1974 | Hadskey | 172/448 X |

FOREIGN PATENT DOCUMENTS

| 631150 | 11/1961 | Canada | 37/2 R |
|---|---|---|---|
| 1059231 | 6/1959 | Fed. Rep. of Germany | 37/2 R |
| 427175 | 11/1947 | Italy | 37/2 R |

Primary Examiner—Edgar S. Burr
Assistant Examiner—Moshe I. Cohen
Attorney, Agent, or Firm—Richards, Harris & Medlock

[57] ABSTRACT

A grubbing plow mounted on two lower arms and an upper attachment point of a 3-point tractor hitch includes a frame having (1) a horizontal pivotal bar journaled at opposite ends thereof on the lower hitch arms; (2) an upper crank arm; and (3) a lower member. The pivot bar is pivotally mounted for rotational movement about a horizontal axis. The upper crank arm and lower member are aligned and oppositely directed from the pivot bar.

A knife-edged, V-shaped blade is rigidly attached to the lower end of the lower member and lies in a plane perpendicular to the length of the lower member.

A hydraulic cylinder is connected between the upper attachment point and the upper end of the upper crank arm for forcibly swinging the blade in an arc around the axis of the pivot bar to engage and remove roots encountered within said arc.

A force transmitting member is pivotally mounted to the frame and extends from the frame for contacting the ground on the side of the frame opposite from which the blade extends. When a reaction force is produced by resistance encountered by the blade, a substantial portion of the reaction force is transmitted directly to the ground through the force transmitting member, thereby reducing the reaction forces transmitted through the tractor.

13 Claims, 5 Drawing Figures

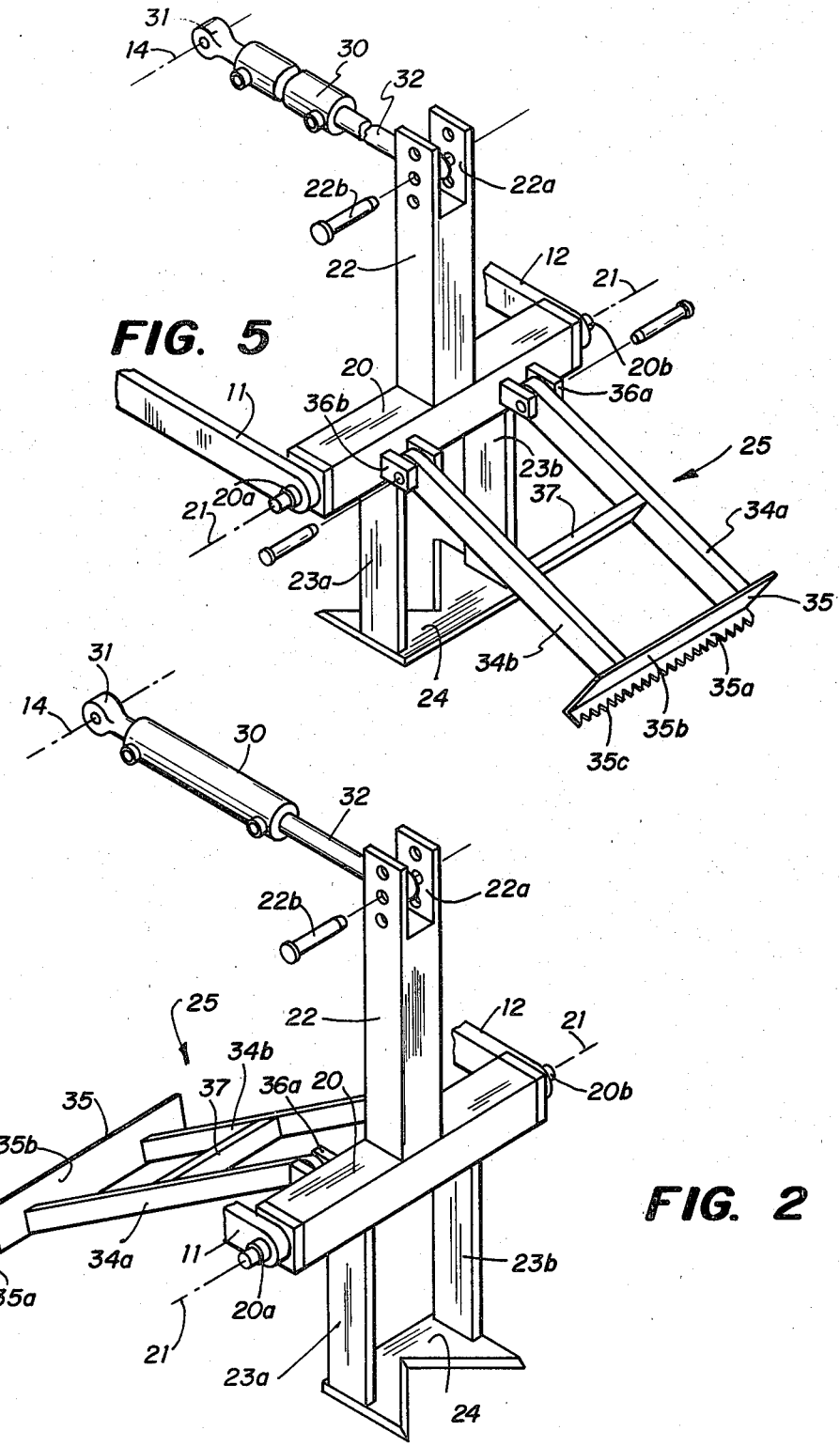

ROOT GRUBBING PLOW

This application is a continuation-in-part application of application Ser. No. 201,543 filed Oct. 28, 1980.

TECHNICAL FIELD

This invention relates to a hydraulically actuated tractor-mounted tool for removing unwanted trees, roots, sprouts and the like.

BACKGROUND ART

The control of unwanted plants, particularly small trees such as mesquite and the like, in pasture areas is a significant problem over wide areas of the earth. Control by chemical sprays, frequent mowings and individual extractions have been utilized. Regardless of the devices and procedures heretofore used, there remains the problem of providing systems and procedures which are economically viable in the control of unwanted sprouts, small trees and the like from pasture areas.

Heretofore, various grubber units have been provided for use in connection with tractor-powered systems. For example, in the Tuttle patent, U.S. Pat. No. 2,734,290, a tree and stone grubber is disclosed in which the vertical lifting mechanism of a 3-point tractor hitch is utilized for removing stones and small trees. Further, U.S. Pat. No. 2,735,198 to Zogg et al., discloses a tractor-actuated grubbing implement for small trees and the like, with the vertical hoisting arrangement of a tractor hitch system being utilized.

DISCLOSURE OF THE INVENTION

The present invention relates to a hydraulic assisted grubbing plow that can quickly and easily be installed on any farm tractor having a standard 3-point hitch. The invention is used for digging up or grubbing small trees and such plants, primarily in the complete removal of undesirable trees or brush-size plants. Mesquite, thorn bushes and many more plants which infest forest, ranges, meadows and cultivated land are significant detriments to the desirable plant growth and utilization of such areas.

The invention involves a knife-edged, V-shaped blade which is driven in an arcuate path centered on the pivots of two lower members of a standard 3-point tractor hitch. A driving force is provided by utilization of a double-acting hydraulic cylinder in place of the upper member of a standard 3-point tractor hitch. By providing a hydraulic cylinder on the upper member, a unique combination is provided.

Conventionally, the top member of a 3-point hitch provides for leveling or orienting the attached implement which is then lifted or lowered by hydraulic actuators coupled to the two lower members of the 3-point hitch. In standard tractor hitch systems the top member is a mechanically adjustable device with a screw linkage for initial adjusting, such as leveling, but thereafter is passive.

In accordance with the present invention, a hydraulic top cylinder member is provided as an active member. It is a source of horizontal moving power which is transformed into a rotational arc-swing of the blade of the grubbing plow as it performs its grubbing operation. In the present invention the two lower members of the standard 3-point hitch serve only to lower the plow into position to begin the grubbing operation and to raise the plow to lift the grubbed plant above ground as may be desired.

A pivotally mounted leg member is provided that transmits at least a portion of the reaction force generated by driving the blade through its arcuate path directly to the ground. This results in less reaction force transmitted through the tractor, thereby reducing stress on the clutch, transmission, wheels and other tractor components.

In a more specific aspect, a grubbing plow for mounting on a 3-point tractor hitch is provided. It includes two lower arms and a frame having a horizontal pivot bar journaled in the two lower members of a 3-point tractor hitch. The frame has an upper member and a lower member extending upwardly from the pivot bar and downwardly from the pivot bar, respectively. The lower member rigidly attaches to a knife-edged, V-shaped blade. An active translational force generator is interposed between the upper end of the upper member and the upper connection of a standard 3-point tractor hitch for forcibly swinging the blade in an arc around the pivot bar axis of rotation. A force transmitting member is provided that includes a leg member pivotally mounted to the frame that extends away from the frame for providing contact with the ground on the opposite side of the frame from which said blade extends. Reaction forces generated when the blade is driven through its arcuate path are substantially transmitted through the leg member, thereby reducing the reaction forces exerted upon the tractor. This arrangement has the effect of stabilizing the tractor and the grubbing tool while reducing wear on the tractor components.

BRIEF DESCRIPTION OF DRAWINGS

A more complete understanding of the invention and its advantages will be apparent from the following Detailed Description taken in conjunction with the accompanying drawings in which:

FIG. 2 is an isometric view of an embodiment where the tractor moves backward to position the blade;

FIG. 5 is an isometric view of the grubbing system oriented in the reverse of the position shown in FIG. 2.

DETAILED DESCRIPTION

Figure 1:
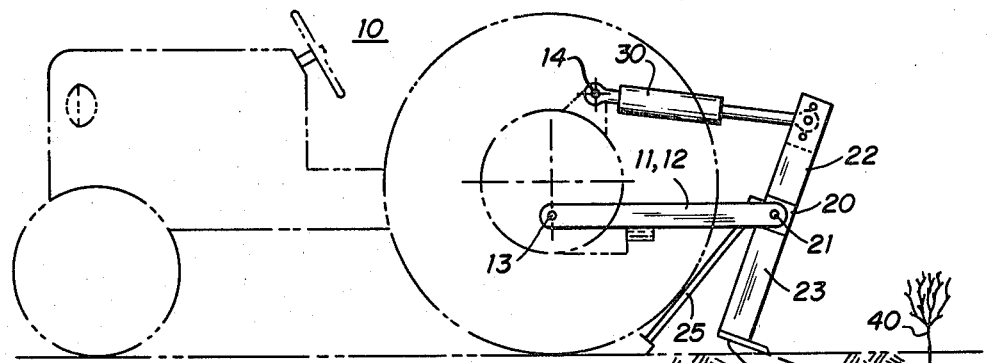
FIG. 1 is a side view, partially broken away, showing an installation of the present invention.

Referring now to FIG. 1, a farm tractor 10 is illustrated as having a 3-point tractor hitch in which two lower members 11 and 12 are connected at laterally spaced points for pivotal motion about an axis 13. The arms 11 and 12 are supported by conventional lifting means (not shown) so that the arms may swing up or down about axis 13. The third point of the 3-point hitch provides for pivotal movement about axis 14.

Conventionally, the upper member of the 3-point hitch pivoted at axis 14 is a threaded screw-nut arrangement which is manually adjusted in order to set an initial attitude of an implement connected to the 3-point hitch.

In accordance with the present invention, the grubbing tool includes a horizontal pivot bar 20 which is mounted for pivotal movement about horizontal axis 21, the connecting point at the rear ends of the links 11 and 12. Pivot bar 20 comprises a frame thus journaled in the lower members of the 3-point hitch. Pivot bar 20 has an upper member 22 and a lower member 23. A V-shaped blade 24 is mounted on the bottom of the lower member 23. Blade 24 is a flat blade whose surface is perpendicular to the axis of the members 22 and 23. A force transmitting structure 25 is pivotally attached to pivot bar 20.

As best shown in FIG. 2, pivot bar 20 is of square cross section with short stub shafts 20a and 20b extending from opposite ends thereof on axis 21. Shafts 20a and 20b are journaled in the rear ends of the lower hitch members 11 and 12.

The upper member 22 is of the same general cross-sectional configuration as the pivot bar 20 and extends from the upper surface of bar 20. A 3-hole adjustable clevis structure 22a is formed in the upper end of the upper member 22 and is provided with holes to receive pin 22b.

A double-acting hydraulic cylinder 30 is fastened by way of link 31 to the pivot axis 14, the upper attachment point for the standard 3-point hitch. The piston 32 then extends to and is secured in the clevis 22a by pin 22b.

The lower member of the grubbing unit comprises a pair of bars 23a and 23b which extend downward from the lower surface of pivot bar 20. The lower ends are perpendicular to the length of the bars 23a and 23b. The blade 24 is secured to the lower ends of the bars 23a and 23b. The plane of the blade 24 is perpendicular to the length of the bars 23a and 23b.

Force transmitting structure 25 includes a pair of leg members 34a and 34b and a scotching foot member 35. Leg members 34a and 34b of force transmitting structure 25 are pivotally connected to pivot bar 20 by separate clevis structures 36a and 36b, respectively, in a horizontal plane that extends through the horizontal axis through which pivot bar 20 is pivotally mounted. Leg members 34a and 34b, as shown in FIG. 2, are preferably flat rectangular bars. Leg members 34a and 34b are connected by a cross member 37, which is perpendicular to the length of leg members 34a and 34b and provides additional rigidity for force transmitting structure 25. Scotching foot member 35 is L-shaped and extends substantially parallel to the pivot axis of pivot bar 20, as shown in FIG. 2, so that when force transmitting structure 25 contacts the ground the minor portion 35a of L-shaped scotching foot member 35 is embedded in the ground while the major portion 35b provides a contact surface for abutting the ground and transmitting a reaction force to the ground. The leading edge 35c of minor portion 35a is preferably toothed, as shown in FIG. 5, to facilitate penetration of minor portion 35a into the ground.

Figure 3:
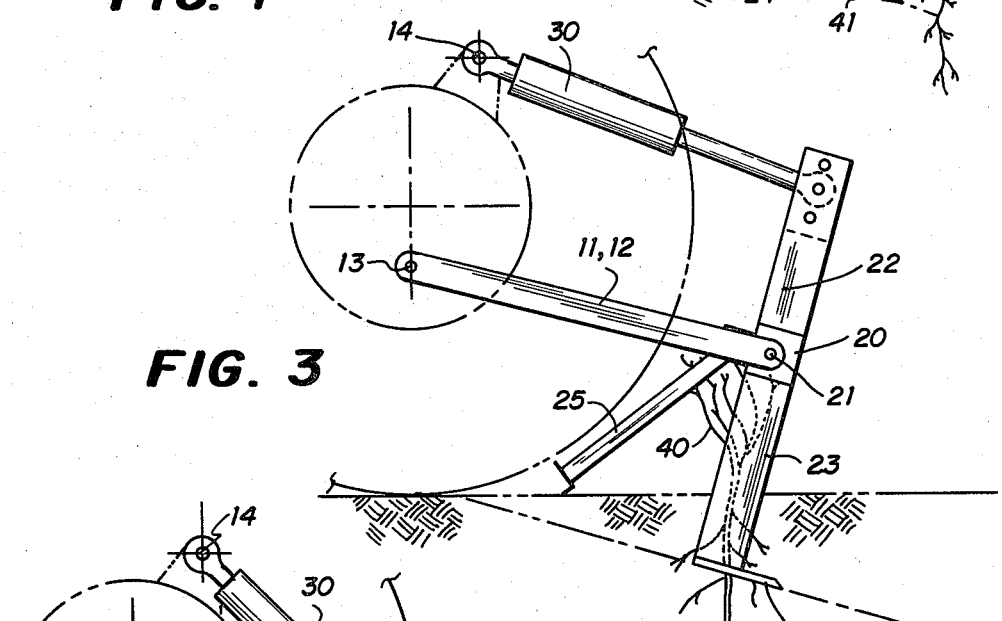
FIG. 3 illustrates a position of the grubber blade preparatory to removal of a root system.
Figure 4:
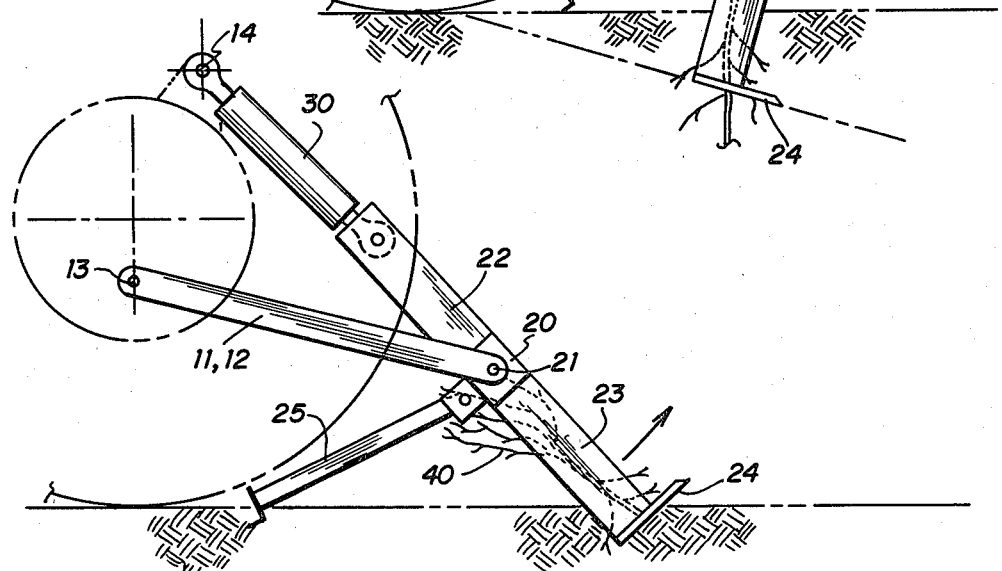
FIG. 4 illustrates the position of the blade with the tree removed.

The operation of the system as attached to a 3-point hitch of a tractor is illustrated in FIGS. 1, 3 and 4.

Referring to FIG. 1, the vertical hoist mechanism of the 3-point hitch is actuated to position the tip of the blade 24 to the ground two or three feet away from the location of a plant 40 which is to be removed. Tractor 10 is then propelled backwards with the 3-point hitch in a floating condition. As tractor 10 moves backward the blade follows a line, such as line 41, extending downward to a point preferably below the bud line of plant 40 while force transmitting structure 25 drags along the ground.

In FIG. 3, the blade 24 is shown in contact with the plant 40 with the grubbing frame tilted backward at a slight angle relative to vertical. With the blade positioned as indicated in FIG. 3, the hydraulic cylinder 30 is energized to change the position of the grubbing frame from the angle shown in FIG. 3 to the angle shown in FIG. 4. As hydraulic cylinder 30 is energized, scotching foot 35 of force transmitting structure 25 becomes embedded in the ground, as shown in FIG. 4. This allows a substantial portion of the reaction force generated by the resistance encountered by the grubbing frame and blade, as they pass through the ground in an arcuate path, to be transferred through force transmitting structure 25 and into the ground. Thus, force transmitting structure 25 reduces the primary power and fuel requirements and also reduces the strain on the tractor drive train, including engine, clutch, transmission, axles and wheels. The power applied to the grubbing tool is not limited by the ability of the tractor to apply a sufficient force to overcome the reaction force generated as the grubbing frame and blade pass through the ground.

The directed movement of the blade 24 in contact with the plant 40 generally causes the tap root of a plant 40 to be withdrawn as the blade-plant contact point moves in an arcuate path. Thus, the hydraulic cylinder 30 may perform all of the operations that a standard top member of a 3-point hitch performs, but in addition affords a source of horizontal power to the grubbing system which is transferred into a rotational arc-swing of blade 24, thereby doing the work involved in the grubbing operation.

The vertical lift power afforded by the two lower members of the standard 3-point hitch serves only to raise and lower the plow and place it in position ready for work. Thus, in operation the tractor moves the grubbing plow adjacent to a tree or plant. The bottom blade 24 is tilted downwardly toward the plant by the hydraulically controlled top cylinder 30. The tilted blade is lowered by the tractor lift arms so that the points of blade 24 touch the ground surface. All restraints for further lowering are then removed so that blade 24 may penetrate below ground with linear motion of the tractor. Movement toward the plant by tractor 10 causes the blade to penetrate below ground and contact the root of the plant, engaging it in the bottom of the V-shaped notch of blade 24. Pressure of blade 24 against the plant is maintained by continued torque of the tractor drive wheels or application of the tractor brakes. When this relationship is achieved, hydraulic cylinder 30 is activated to move blade 24 along an arc from (a) downward tilt to (b) horizontal to (c) upward tilt, providing thereby the downward to horizontal to upward rotation force which pulls the plant roots free of the soil. At the same time, scotching foot 35 becomes embedded in the ground, allowing force transmitting structure 25 to direct the reaction force substantially through the ground directly, instead of through the tractor helping to prevent the tractor from moving backward. This provides additional stability for the tractor and the grubbing tool during operation and permits the removal of larger trees. The wedging action of the V-shaped blade 24 and the partial cutting of the plant by the sharpened edges of the V-notch in blade 24 provide secure grasping of the plant root throughout the grubbing operation.

In contrast, units in the prior art involve a fixed top link which results essentially in a parallelogram configuration. As such, there is no arc-swing of the blade, only a slight horizontal movement of the blade as the parallelogram is moved vertically. The fixed downward inclination of the blade remains unchanged throughout the work and is conducive to the slippage of the sprout out of the grasp of the blade as the blade is lifted. Strictly vertical lifting of the blade by this configuration disturbs all of the soil above the blade and adjacent to the sprout, further loosening the grasp of the blade on the sprout, without providing any horizontal cutting action of the blade.

In contrast, the arc-swing of the blade afforded by the active top link permits the leading edge of the blade to encounter the sprout, force it first downward, then horizontally and finally upward with constant pressure against the sprout and with minimum disturbance or loosening of the soil adjacent to it. This action, coupled with the wedging action of the V-shaped blade and the cutting, or partial cutting into, by the knife-sharp edge, assures the maximum grasping of the sprout. This is far different and beyond the grasp possible with strictly passive top linkage. At the completion of the arc-swing the sprout is pulled free of the soil, or cut below the bud line. It can be lifted completely free of the ground by continued linear travel of the tractor, by use of the tractor lift arms or by hand, but it is pulled loose by the arc-swing with the arc-swing doing all the work. This is a significant difference over prior systems. The tractor lift arms can be raised to disengage the scotching foot from the ground.

It has been established that the use of this type of grubbing unit, without the scotching foot improvement, results in complete removal of 91 percent of plants. In 5 percent of the plants, the stem was cut below the bud growth ring. Of the remaining 4 percent there was partial destruction of the plant. Tests, carefully controlled, show that the plow operates with great speed and requires a minimal expenditure of energy, making it the most efficient tool and method yet devised for controlling brush. The system works best for removal of trees and plants having tap roots, but it also works well on other types of plants. In all cases the main stump is removed, and generally along with the tap root and/or lateral roots. It has been found that the arcuate motion achieved by utilization of the active upper link in the 3-point hitch system, together with the structure of the blade as provided by the present invention, readily and efficiently performs the desired removal operation.

In the foregoing description it has been noted that the blade 24 is rearward facing and that the blade is positioned for extraction by a reverse movement of the tractor which drives the blade into the ground to a depth below the bud growth line. The blade direction and the force transmitting member direction may be reversed, as in FIG. 5. In such case, blade 24 would be tilted forward and downward. The tractor would be moved forward into position over the tree. The action of hydraulic link 32 of the system would then be actuated to push on the top of the upper member 22 to rotate the blade from a rearward position to a forward position as it follows its arcuate path, while embedding scotching foot 35 in the ground to prevent the tractor from moving backward. Thus, it will be appreciated that the system is reversible, providing for either operation, as may be deemed optimum by the operator. Thus, the system may be mounted for use in either of two directions by merely disconnecting the 3-point linkages as shown in FIG. 2 and rotating the unit about a vertical axis so that the direction of the blade 24 is simply reversed.

Having described the invention in connection with certain specific embodiments thereof, it is to be understood that further modifications may now suggest themselves to those skilled in the art, and it is intended to cover such modifications as fall within the scope of the appended claims.

I claim:

1. A grubbing plow for extraction of vegetation from soil, said plow being mounted to a vehicle by a 3-point hitch having two lower arms and an upper attachment point, said grubbing plow including means enabling the extraction of vegetation from the soil while said vehicle is maintained stationary, comprising:

(a) a frame having a horizontal pivot bar journaled at opposite ends thereof on said lower arms and having an upper member and a lower member, said pivot bar being pivotally mounted for rotational movement about a horizontal axis, said upper and lower members being aligned and oppositely directed from said pivot bar;

(b) a knife-edged, V-shaped blade rigidly attached to the lower end of said lower member and lying in a plane perpendicular to the length of said lower member;

(c) a double acting hydraulic cylinder connected between said upper attachment point and the upper end of said upper member for forcibly swinging said blade in an arc around the axis of said pivot bar, said double acting hydraulic cylinder moving said blade between a first position within the soil for engaging the vegetation to be grubbed through said arc to a second position for lifting and removing the vegetation from the soil, such that the vegetation is extracted from the soil by operation of said hydraulic cylinder swinging said blade through said arc while the vehicle is maintained stationary; and (d) a force transmitting member including a leg member pivotally mounted to said frame and extending away from said frame for providing contact with the ground on the opposite side of said frame from which said blade extends for transmitting a portion of the reaction forces generated by said blade when said blade travels in an arc around the axis of said pivot bar.

2. The plow as recited in claim 1 wherein said leg member is pivotally mounted to said pivot bar in a horizontal plane that extends through the horizontal axis through which said pivot bar is pivotally mounted.

3. The plow as recited in claim 1 wherein said leg member comprises a pair of spaced apart flat rectangular bars connected by a member perpendicular to the length of said bars.

4. The plow of claim 1 in which said lower member comprises a pair of spaced apart flat rectangular bars with said blade integrally attached to the lower ends thereof.

5. The plow of claim 4 wherein said bars are oriented for minimum obstruction upon forward movement of said blade.

6. The plow of claim 1 wherein said force transmitting member terminates with a scotching foot portion adapted for contacting the ground and rigidly connected to said leg member.

7. The plow as recited in claim 6 wherein said scotching foot is L-shaped and extends substantially parallel to the pivot axis of said pivot bar.

8. A grubbing plow for extraction of vegetation from soil said plow being mounted to a vehicle by a 3-point hitch having two lower arms and an upper attachment point, said grubbing plow including means enabling the extraction of vegetation from the soil while said vehicle is maintained stationary, comprising:

(a) a horizontal pivot bar journaled at opposite ends thereof on said lower arms;

(b) an upwardly directed crank arm extending from the center of said pivot bar;

(c) a pair of spaced apart plates integral with and extending downwardly from said pivot bar, each having rectangular horizontal cross section and oriented with the long cross-sectional dimensions normal to the length of said pivot bar;

(d) a knife-edged, V-shaped blade integrally attached to the lower ends of said plates and lying in a plane perpendicular to the length of said plates;

(e) a double acting hydraulic cylinder connected between said upper attachment point and the upper end of said crank arm for forcing said blade to follow an arc centered on the axis of said pivot bar, said double acting hydraulic cylinder moving said blade between a first position within the soil for engaging the vegetation to be grubbed through said arc to a second position for lifting and removing the vegetation from the soil, such that the vegetation is extracted from the soil solely by operation of said hydraulic cylinder swinging said blade through said arc while the vehicle is maintained stationary; and (f) a force transmitting member including a leg member pivotally mounted to said horizontal pivot bar and extending away from said horizontally mounted pivot bar for providing contact with the ground on the opposite side of said spaced apart plates from which said blade extends, for transmitting to the ground a substantial portion of the reaction forces produced by said blade when said blade moves through said arc.

9. The plow as recited in claim 8 wherein said force transmitting member terminates with a scotching foot portion adapted for contacting the ground and rigidly connected to said leg member.

10. The plow as recited in claim 8 wherein said leg member is pivotally mounted to said pivot bar within the horizontal plane that extends through the horizontal axis through which said pivot bar is pivotally mounted.

11. The plow as recited in claim 10 wherein said leg member comprises a pair of spaced apart flat rectangular bars connected by a member perpendicular to the length of said bars.

12. The plow as recited in claim 11 wherein said force transmitting member terminates with a scotching foot portion adapted for contacting the ground, said scotching foot comprises an elongated L-shaped member extending substantially parallel to the pivot axis of said pivot bar.

13. A method of grubbing a small tree comprising the steps of:

moving a vehicle adjacent the tree;

stopping the vehicle adjacent the tree and maintaining the vehicle stationary while the tree is uprooted;

advancing the knife-edge of a V-shaped blade attached to the vehicle from the earth's surface along a substantially linear path to a position below the earth's surface adjacent the tree;

actuating a hydraulic cylinder attached between the vehicle and the blade for rotating the blade through an arcuate path to thereby move the blade initially downward to engage the tree below the earth's surface, then horizontally and then arcuately upwardly to uproot the tree while maintaining the vehicle stationary, such that the blade is moved through the arcuate path by operation of the hydraulic cylinder; and simultaneously transmitting a substantial portion of the reaction forces produced from resistance encountered by the blade below the earth's surface directly through a force transmitting member while the blade travels through the arcuate path, thereby transmitting reaction forces to the earth's surface and reducing the reaction forces transmitted to the vehicle.

* * * * *